N. SILVERTHORN.
HOG SCRAPING-MACHINE.

No. 175,772. Patented April 4, 1876.

Witnesses
Geo. A. Aird
Hugh Aird

Inventor
Newman Silverthorn
per D. E. Ridout & Co.
Att'ys

UNITED STATES PATENT OFFICE.

NEWMAN SILVERTHORN, OF SUMMERVILLE, CANADA.

IMPROVEMENT IN HOG-SCRAPING MACHINES.

Specification forming part of Letters Patent No. 175,772, dated April 4, 1876; application filed April 29, 1875.

*To all whom it may concern:*

Be it known that I, NEWMAN SILVERTHORN, of the village of Summerville, in the county of Peel, in the Province of Ontario, Canada, have invented an improved machine designed for the purpose of economizing manual labor in the scraping or cleaning of hogs, of which the following is a specification:

This invention consists in an arrangement of straight scrapers affixed horizontally to endless belts passing around four drums (held within a suitably-constructed frame) upon shafts or spindles made to revolve by the most convenient mechanical power, the whole machine being so arranged and operated, as hereafter specified, that the body of the hogs rest upon the traveling scrapers, which, in passing over the surface of the body, effectually remove the hair, &c., from the hog, as desired.

Figure 1:
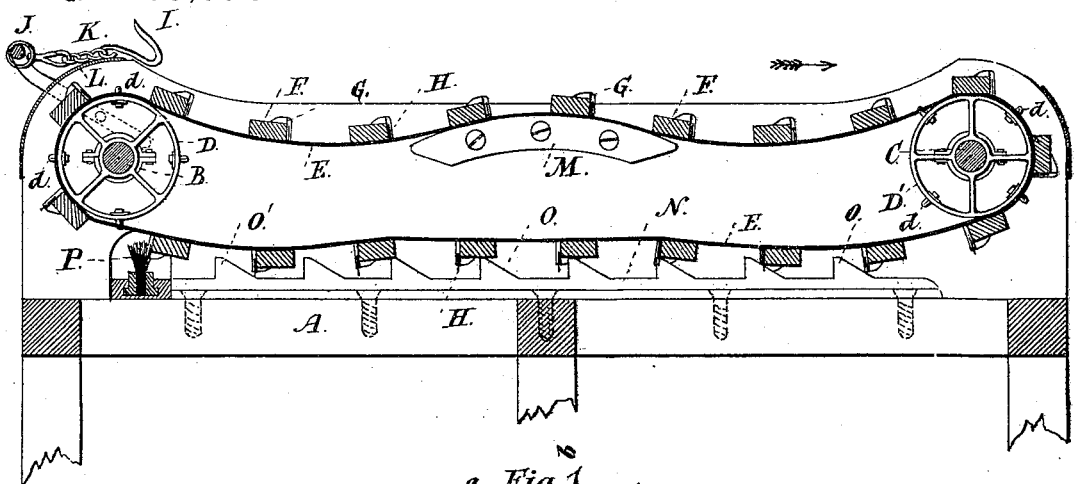
Figure 2:
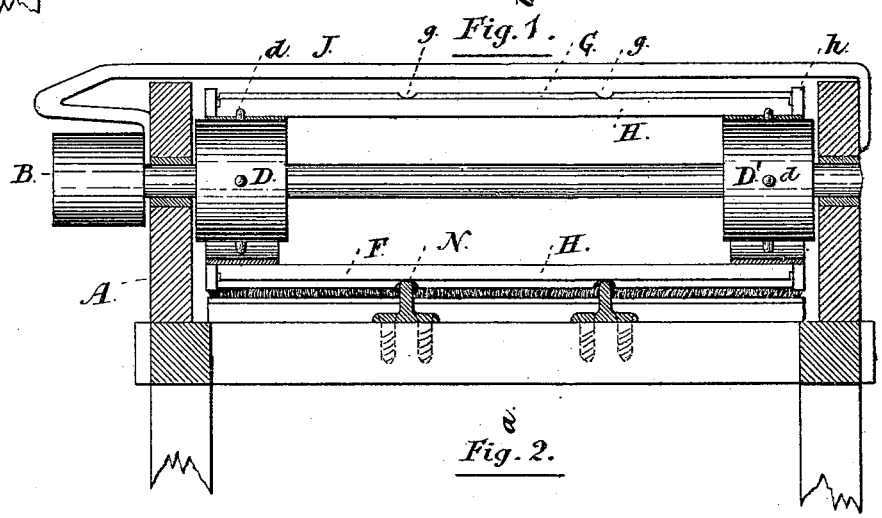
Figure 3:
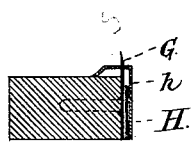
Figure 4:
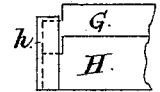
Figure 5:
Figure 6:
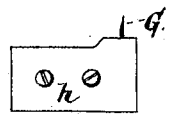

Figure 1 represents a longitudinal section. Fig. 2 represents a cross-section through A B. Fig. 3 is a detail sectional end view of scraper-holder with scraper and scraper-cleaner attached. Fig. 4 is a detail plan of scraper-holder with scraper and scrape-cleaner attached. Fig. 5 is a detail sectional plan of scraper-holder with scraper and scraper-cleaner attached. Fig. 6 is an end view of scraper-holder with scraper and scraper-cleaner attached.

A is the frame, made of any material and design suitable for the purpose of the machine. B is the driving-shaft, and C the carrying-shaft. D D' are the drums, with teeth *d* placed in them, as shown. E are the endless belts or chains passing around these drums, and upon which the scraper-holders F are secured. To these holders the scrapers G are bolted or otherwise fastened. H are the scraper-cleaners, held loosely within the clips *h*. The frame A is placed on an inclination immediately next to the platform at the end of the scalding-vat. When the hog is elevated from the vat it rests on the platform referred to till the hook I is inserted through its lower jaw. This hook is attached, by a short swivel-chain, K, to the sliding bar J, as shown; or a long chain or rope pivoted at the farther end might be substituted for the said short swivel-chain; or, again, an open hook sliding on the bar might answer the purpose equally well. When the hog is hooked, as described, the tip of its lower jaw should not pass beyond the upper edge of the plate L. In this position the hog is rolled by the operator onto the traveling scrapers, which, when in motion, pass rapidly by the animal and pretty effectually scrape it while it is being rolled across the machine by the operator. The inclination of the scrapers given by that of the frame assists the operator in rolling the hog across the machine. The notches *g* cut in the scrapers G are for lessening the friction on the prominent parts of the animal's limbs. The scrapers G shall be distributed in such numbers on the endless belt that from the weight of the hog resting upon them the same shall be sufficient, while the machine is in motion, to remove the hair, &c., from the body of the hog.

On each side of the machine a segment, M, is placed, for the purpose of supporting the belts E, as shown. The hams and shoulders of the hog fall on either side of the segment M, while the body part between them rests on those scrapers supported by the said segments. By this arrangement all portions of the hog is reached, and no undue pressure is experienced at any particular point.

When the machine is in motion it is driven in the direction indicated by the arrow; it follows, then, that as each scraper performs its duty it passes over the drum D', and in doing so its cleaner H falls by gravitation toward the cutting-edge of the scraper G, passing the said edge and carrying any hair, &c., which may have adhered. While the machine is in motion the scrapers G, after passing over the drum D', as described, continue, and in succession come in contact with the teeth O of the ratchet-rack N, as shown in Fig. 1. By this action the cleaners H, which, in traveling over the drum D', fall past the cutting-edge of the scraper G, are raised clear of the said edge in passing over each tooth O, falling again between each of the said teeth, passing and repassing the scraper G. In this manner the cleaners effectually perform the service required of them, and by the time they reach the last tooth O' will probably be perfectly clean; but in order to make their cleanliness doubly sure, a brush, P, is carried across their path, as shown.

What I claim as my invention is—

1. The flexible endless belts E, having the scraper-holders F, scrapers G g, scraper-cleaners H, and clips h, combined with the drums D D', adapted to be rotated by suitable mechanism, substantially as and for the purposes specified.

2. In combination with the flexible endless belts E, provided with scraping and scraper-cleaning devices, as described, the ratchet-rack N, having teeth O, substantially as specified, for the purposes set forth.

3. In combination with the flexible endless belts E, provided with scraping and scraper-cleaning devices, as described, the segments M for adapting the belts to the shape of the carcass, substantially as and for the purposes described.

N. SILVERTHORN.

Witnesses:
   DONALD C. RIDOUT,
   GEO. A. AVID.